United States Patent [19]

Nilsson

[11] Patent Number: 4,566,017

[45] Date of Patent: Jan. 21, 1986

[54] METHOD AND TRANSDUCER FOR INCREASING INKING RESOLUTION IN AN INK-MOSAIC RECORDING DEVICE

[75] Inventor: Kenth Nilsson, Akersberga, Sweden

[73] Assignees: Siemens Aktiengesellschaft, Berlin & Munich, Fed. Rep. of Germany; Siemens Eleman AB, Solna, Sweden

[21] Appl. No.: 658,745

[22] Filed: Oct. 9, 1984

[30] Foreign Application Priority Data

Nov. 15, 1983 [DE] Fed. Rep. of Germany ....... 3341401

[51] Int. Cl.[4] ............................................. G01D 15/18

[52] U.S. Cl. .................................. 346/140 R; 346/1.1

[58] Field of Search .......................... 346/1.1, 140 PD

[56] References Cited

U.S. PATENT DOCUMENTS

| | | | |
|---|---|---|---|
| 3,871,004 | 3/1975 | Rittberg | 346/140 PD X |
| 3,995,282 | 11/1976 | d'Alton-Rauch et al. | 346/140 |
| 4,072,959 | 2/1978 | Elmquist | 346/140 |
| 4,308,547 | 12/1981 | Lovelady et al. | 346/140 PD |
| 4,386,358 | 5/1983 | Fischbeck | 346/140 PD X |
| 4,453,169 | 6/1984 | Martner | 346/140 PD |

FOREIGN PATENT DOCUMENTS

| | | | |
|---|---|---|---|
| 2444517 | 9/1976 | Fed. Rep. of Germany | 346/140 PD |
| 83459 | 5/1982 | Japan | 346/140 PD |

*Primary Examiner*—George H. Miller, Jr.

*Attorney, Agent, or Firm*—Hill, Van Santen, Steadman & Simpson

[57] ABSTRACT

A method and apparatus for increasing inking resolution with an ink-mosaic recording device. In order to increase the resolution simply and without additional transducers, each transducer is comprised of two contacted piezoelectric strips which are enclosed between plates. By means of differing voltage on the strips, the transducer bends in addition to a change in cross-section of the channel formed. Thus, it becomes possible to eject drops of fluid at different positions intermediate undeflected drop ejection positions.

12 Claims, 16 Drawing Figures

METHOD AND TRANSDUCER FOR INCREASING INKING RESOLUTION IN AN INK-MOSAIC RECORDING DEVICE

BACKGROUND OF THE INVENTION

The invention relates to a method for the increase of inking resolution in an ink-mosaic recording device with a number of piezoelectric transducers arranged in series. By means of piezoelectric deformation of transducers, recording fluid is ejected dropwise in a given direction to a recording carrier.

With known ink-mosaic recording devices, previously an inking resolution of approximately four drops of ink per millimeter was attained. (German Patent Specification No. 25 27 647, incorporated herein by reference.) For an improvement of the type character, approximately ten such drops of ink per millimeter would be desirable. In addition, it was already suggested to arrange several series of piezoelectric transducers offset in a direction of paper transportation. This requires, however, doubling of the electronics and an accurate recording carrier feed mechanism to avoid a distortion in the type character. A diminishing of the spacing between the piezoelectric transducers of a series—apart from technical production difficulties—increases appreciably the danger of the hydraulic coupling between the transducers.

SUMMARY OF THE INVENTION

An object of the present invention is to provide a method and a transducer with which the inking resolution in an ink-mosaic recording device of the type mentioned at the beginning may be increased in simple manner and without additional piezoelectric transducers. This problem is solved, according to the invention in that the individual transducers are comprised of two strips of piezoelectric material which are arranged at a spacing from one another and are contacted on both sides. The strips are covered by plates on both sides in such manner that between the strips and the plates a longitudinally extended substantially rectangular channel results out of which the recording fluid is ejected. The two strips, at least timewise, will be deformed differently. With the transducers provided here, the ink channels directly formed the recording nozzles. A separate matrix of holes may accordingly be omitted. If, for example, an electrical voltage is applied to the strips, the latter becomes narrower and higher, so that the enclosed cross-section of surface of the channel is enlarged. Thus, additional recording fluid is sucked into the channel. If the voltage on this contacting is removed or for a short time actually an impulse of reverse polarity is applied, the strips return to their original form, whereby the channel volume is promptly lessened. This leads to an ejection of the recording fluid.

Upon application of voltage, the piezoelectric strips at the same time become shorter. If in accordance with the method according to the invention both strips of a piezoelectric transducer are differently deformed, for example by means of application of different voltages, then sufficient enlargement of the cross-section may still always be attained in order to be able to suck additional recording fluid into the ink channel. At the same time, however, the transducer is somewhat bent, due to the different length expansion of the two piezoelectric strips, so that end of the transducer facing the recording carrier is laterally deflected. When the deformation of the two strips of the transducer is cancelled but the differing length extension and thus the flexing of the transducer is still retained for the moment, then a drop of fluid that is laterally offset to the position of the transducer in its unflexed condition is ejected. If the recording carrier is, as is usual, conveyed close to the ink channels, then the offset of the encountering point of the drop of ink corresponds approximately to the offset of the channel-mouth.

The bending of the ink channel and the ejection of a drop of ink in this position may, for example, be accomplished such that on a voltage impulse applied simultaneously to both piezoelectric strips a different voltage (potential) is superimposed for both strips which causes and maintains the bending.

With the deflection, solely the mass of one single transducer must be accelerated. This makes it possible to undertake the deflection with an amplitude which corresponds somewhat to one-fourth of the spacing between the drops of fluid produced with resting transducers. If, as an example, a recording head is provided in which the ink channels have a spacing of about 250 λm, a deflection amplitude of about 60 λm results. The synchronization would in this case take place so that a drop of fluid in each case is ejected at the maximum deflection in the one or the other direction. In this manner, the number of drops per mm would already be doubled. If the deflection amplitude is increased to 80 λm, and if also the non-curved rest position of the ink channel is used for the ejection of a drop, the number of drops per mm will already be tripled. As the ink channels at the moment of ejection of a drop of fluid are found practically at rest, no speed component is superimposed on the drop transversely to its direction of flight.

It is, on the other hand, possible to undertake the deflection of the transducer synchronously with the ejection of a drop of ink so that a transverse component of speed is superimposed on the drop of fluid. Thus, the encountering point of the drop is pushed further on the recording carrier in correspondence with the deflection of a transducer. In this case, the operation may take place with a substantially smaller deflection amplitude.

Also, a combination of both previously described deflection methods is to be conceived. In principle, the encountering points of the fluid drop can be as close as desired to the recording carrier.

The chronological bending of the piezoelectric transducer applied for the ejection of a drop of fluid occurs by applying different voltage impulses to a common voltage impulse and which are superimposed for each respective one of the two strips. The voltage impulses additionally applied to the two strips may in this connection have a different amplitude or also a different polarity. The duration of the impulses must be so selected such that the desired bending of the piezoelectric transducer is attained before the ejection point, and is maintained until after the ejection of the drop of fluid if the procedure is to be free of additional transverse speed components.

An ink-mosaic recording device for carrying out the method is simple in construction and stable for operation is achieved, when the transducers at the end facing away from the recording carrier are connected through a stem or common base portion. The set-up of the entire deflection arrangement is thus simplified.

In addition, expensive adjusting operations for the alignment of the individual transducers are eliminated. Under certain circumstances, the electrical drive may still be simplified such that the plate on one side of the strips is made of metal, and serves as a common electrode for both or all strips. In this case, the required additional contacting on this side of the strips may be eliminated.

An advantageous improvement of the ink ejection results if the outlet opening of the ink channel is decreased, and the channel, for example in the end area, is tapered off. In a simple embodiment, the strips of a transducer form a sharp angle.

A transducer arrangement for carrying out the method is produced in simple fashion by providing a channel matrix which is formed of a series of strips made of piezoelectric material, which are arranged parallel and with a spacing from one another, are contacted electrically on both sides and covered on both sides with a plate covering all strips, and are divided in each case into two strips at least over a part of the length and parallel to the same. In this way, an arrangement like a comb is achieved where the teeth are formed by the individual transducers with the ink channels and where a common base portion connects all transducers.

DESCRIPTION OF THE PREFERRED EMBODIMENTS

Figure 1:
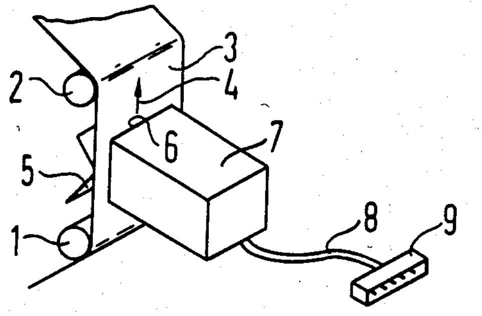
FIG. 1 is a perspective view of an ink-mosaic recording device.

In FIG. 1 the outer principal construction of an ink-mosaic recording device is illustrated. Over transporting rolls 1 and 2, the recording carrier 3, for example, normal recording paper, is drawn in a direction of the arrow 4 over a spacer 5 past the front side 6 of a housing 7. In the housing 7 the connecting terminal 8 is provided which at its free end has a plug 9 for the connection with a corresponding control unit which supplies the control signals for the recording of the desired paths, symbols, images, and for synchronization between the timely deflection of the particular transducer and the ejection of the individual drops of fluid. The housing 7 contains the actual recording head, of which a possible embodiment is shown in FIG. 2.

The recording head 10 is comprised of a series of piezoelectric transducers 11 to 14 and a reservoir 15 for recording fluid 16. Within the transducer 11 the ink channel 17 is indicated in dotted lines and which, in combination with FIG. 3, will be described more in detail in the following. For the sake of viewing ease, the representation of the electrical contacting of the piezoelectric strips is eliminated. As is further inferred from FIG. 2, the piezoelectric transducers 11 to 14 are connected at the rearward end with one another by a common base portion or stem 18. At this point, it is noted that in principle it is also possible to construct each transducer individually and fastened separately in the recording head. The embodiment shown has the advantage of an appreciably simplified production, since first a closed channel matrix can be produced, in which a series of contacted piezoelectric strips are arranged on a first plate parallel with one another and covered with a second plate. After two strips in each case, an almost complete slit is sawed in a longitudinal direction. In this manner, a comb-like transducer arrangement is produced as is utilized in the embodiment according to FIG. 2.

Figure 2:
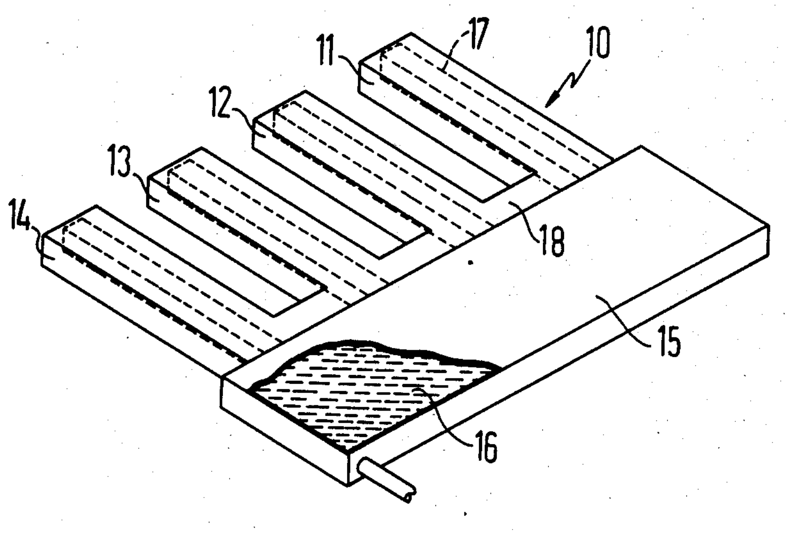
FIG. 2 is an example of a recording head with four piezoelectric transducers.
Figure 3:
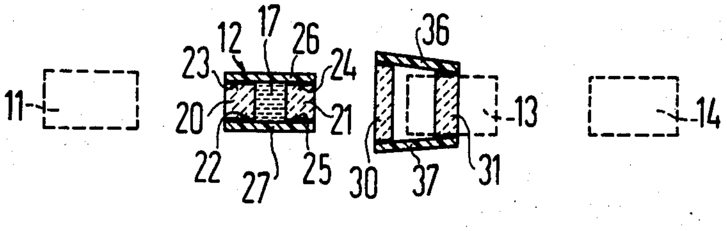
FIG. 3 is a cross-section through the recording head, according to FIG. 2.

FIG. 3 shows a cross-section through the transducer arrangement according to FIG. 2. In this connection, the two outermost transducers 11 or 14 are indicated solely in dotted lines. Likewise, the transducer 13 is indicated solely in the rest position. The transducer 12 shown in cross-section in greater detail, and the other transducers are formed of two piezoelectric strips 20 or 21, provided on both sides with a contacting 22 to 25, and are enclosed between two plates 26 and 27. The two plates 26 and 27 are a non-conducting material.

If now, as assumed for the transducer 13, a voltage is applied to the two piezo-strips 30 or 31 of transducer 13, then these strips become higher and at the same time narrower and shorter. If, as assumed in FIG. 3, a different high voltage is applied to the two strips 30 or 31, there result differing changes in length of the strips in the three dimensions. Through the differing change in length of the strips, the transducer element bends. In spite of the differing changes in height and breadth, the cross-sectional surface of the ink channel is increased so that recording fluid is sucked in.

If the cross-sectional enlargement is subsequently made reversible and the bending is retained, a drop of fluid is ejected from an offset channel opening.

Figure 4A:
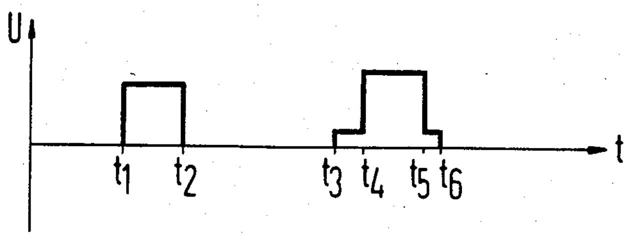
FIGS. 4*a* and *b* are voltage curves for the two piezoelectric strips of a transducer.
Figure 4B:
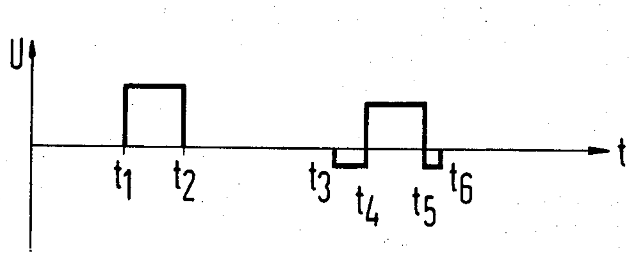

In FIGS. 4*a* and 4*b* is shown by way of example a curve of the voltage applied to both strips of a transducer. In this connection, it is assumed that in FIG. 4*a* the voltage is shown on the strip 30 and in FIG. 4*b* it is shown on strip 31. At time $t_1$, an equally great voltage is applied to both strips 30 or 31, which up to time $t_2$ is held constant, and thereafter promptly again returns to the starting value. With the aid of this rectangular impulse on both strips, the normal effect of such a transducer element results through the voltage applied, the cross-sectional surface enlarges, and ink is sucked into the ink-channel. At time $t_2$, the cross-sectional surface and also the volume of the ink channel grows smaller so that in the direction of the ink-channel, a drop of fluid is ejected. A bending of the transducer element does not take place in this case.

At time $t_3$, it is assumed that on both strips, a small equal but opposite voltage is applied, for example 20 V. This leads first to a bending of the transducer 13 but not to a cross-sectional enlargement of the ink channel. At time $t_4$, there is superimposed on this voltage a voltage impulse of for example 100 V, as between times $t_1$ and $t_2$, and which lasts up to time $t_5$. At time $t_6$, finally the voltage returns on both strips again to the starting value. In the time interval between $t_4$ and $t_5$, the cross-sectional surface of the ink channel of the deflected transducer is enlarged. At time $t_5$, this cross-sectional enlargement is made reversible. The deflection, however, is maintained. First at time $t_6$, the deflection is also made reversible.

Figure 5:
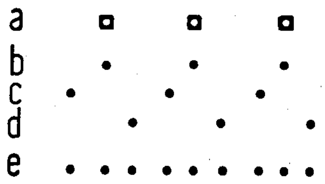
FIGS. 5*a* to *e* show the recording points relative to the ink channels at different times.

On the basis of FIGS. 5*a* through 5*e*, it can be explained how the higher solution results. In FIG. 5*a*, for the sake of simplicity, only three outlet openings of transducers are shown adjacent one another, and from which in each case, drops of fluid are to be ejected. In FIG. 5*b*, it is assumed that the transducer is not deflected, so that the positions of the recording points correspond with the positions of the resting transducer. In FIG. 5*c* it is assumed that all of the transducers before ejection of a drop of fluid are deflected to one side, so that also the recording points are pushed to this side. In FIG. 5*d*, the deflection is undertaken on the other side. FIG. 5*e* finally shows all of the recording points made possible thereby. Already with the aid of three ink channels, in this way and manner nine recording points are attained.

The embodiments of FIGS. 1 to 5 are, for the sake of viewing ease, not shown true to scale. On the basis of these Figures, only the essential features according to the invention are shown, and an advantageous embodiment of the recording head. Without departing from the framework of the invention, it is possible by means of different strong deflections of the individual transducers, to increase further the number of recording points.

Furthermore, it is also possible to synchronize the deflection of the transducers with the ejection of the drop of fluid by superimposing a speed component on the same. Thus, a further variation possibility is provided through which the position of the encountering point of the drop may be further changed. A special advantage of the method according to the invention and for the ink-mosaic recording device carrying out the method, is that the additional deflection of the transducer and the higher inking resolution attained thereby, must be utilized only in case of need, and only for this case must a lower paper speed be accepted. For layouts with lower requirements of resolution, the operation may always proceed with a higher paper speed. For both cases, i.e. low or high resolution, always one recording head, and thus an electronic control, is necessary. The additional expenditure for the increase in the resolution is therefore limited to a minimum.

Formation of the voltage waveforms shown in FIGS. 4*a* and 4*b* for application to piezoelectric elements 20 and 21 or 30 and 31 in FIG. 3 can easily be accomplished by a waveform generator circuit by those skilled in this art. As previously explained, at time $t_3$ one simply applied equal but opposite voltages to piezoelectric elements and then at a later time $t_4$ this voltage is superimposed upon the voltage impulse used between times $t_1$ and $t_2$.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for increasing inking resolution in an ink-mosaic recording device having a recording head with a plurality of serially-arranged piezoelectric transducers wherein by means of piezoelectric deformation of the transducers, recording fluid is ejected drop-wise in a direction toward a recording carrier, comprising the steps of:

forming each of the transducers with two spaced strips of piezoelectric material which are contacted on opposite sides for electrically driving the same, and are covered on opposite sides by plates, the plates and strips forming a longitudinally extending substantially rectangular channel;

providing recording fluid in the channel for ejection from an end thereof; and applying voltages through the contacts to the two strips such that the two strips at least timewise are deformed differently.

2. A method according to claim 1 wherein for ejection of a drop a first voltage impulse is applied to each of the two strips and for providing said differing deformation first and second additional differing voltage impulses are superimposed on the first voltage impulse at the respective piezoelectric strips so as to create first and second composite voltage impulses respectively applied to the first and second strips such that when the two composite voltage impulses are simultaneously applied, during at least a portion of the time of application the strips undergo a differing deformation with respect to one another.

3. A method for increasing inking resolution in an ink-mosaic recording device having a recording head with a plurality of piezoelectric transducers each of which expel ink towards a recording carrier as a result of a piezoelectric deformation of the transducer which causes a change in volume of the transducer so as to eject in drop-wise fashion the recording fluid, comprising the steps of:

forming each of the transducers of two spaced substantially identical piezoelectric elements which are covered on opposite sides by first and second plates so as to form an enclosed channel between the plates and piezoelectric elements;

providing electrical contacts to the first and second piezoelectric elements to provide for individual deformation of the elements;

applying first and second voltage impulses to the first and second piezoelectric elements so as to cause a change in volume of the channel which results in ejection of a portion of recording fluid towards the recording carrier;

at another point in time applying third and fourth voltage impulses to the respective first and second piezoelectric elements so as to cause a differing deformation of the two elements which results in a bending of the transducer with the channel therein transversely to a direction of recording fluid ejection towards the recording carrier; and while the transducer is bent, applying fifth and sixth respective voltage impulses to the respective first and second piezoelectric elements so as to cause a change in volume resulting in a drop-wise ejection of recording fluid while the piezoelectric transducer is bent, whereby recording fluid is ejected not only at an unbent position of the transducer but also at a bent position of the same transducer.

4. A method according to claim 3 wherein the first and second voltage impulses are substantially equal to one another, the third and fourth voltage impulses are substantially equal but of opposite polarity, and the fifth and sixth voltage impulses are similar to the first and second voltage impulses but superimposed on the third and fourth voltage impulses.

5. A method according to claim 3 wherein the transducer in a cycle deposits three ink drops, one ink drop to one side of the unbent position, one ink drop at the unbent position, and another ink drop at the other side of the unbent position.

6. In an ink-mosaic recording device having a piezoelectric transducer which ejects a recording fluid in drop-wise fashion toward a recording carrier given a deformation of the transducer, wherein the improvement comprises:

first and second piezoelectric elements which are spaced apart and are covered at opposite sides by first and second plates so as to form an enclosed contral ink channel;

electrical contact means on each of the first and second piezoelectric elements to provide for application of a voltage thereto to cause a deformation thereof; and voltage impulse means applied to the first and second piezoelectric elements such that in a first condition a volume change of the ink channel occurs resulting in a drop-wise ejection of recording fluid without the transducer substantially bending and in a second condition the transducer bends in a direction substantially transverse to a direction of drop ejection towards the recording carrier.

7. A device according to claim 6 wherein the voltage impulse means provides a third condition wherein the transducer is bent and also changes its cross-section resulting in a drop-wise ejection of recording fluid while the transducer is bent.

8. A device according to claim 6 wherein a plurality of substantially rectangular transducers with ink channels therein are provided which are connected to one another via a common base portion or stem.

9. A device according to claim 6 wherein one of the plate is formed of an insulating material and the other plate is formed of a conductive material and serves as a common electrode for both piezoelectric elements.

10. A device according to claim 6 wherein the first and second piezoelectric elements comprise substantially rectangular longitudinally extending strips each having first and second contacts at opposite surfaces thereof with the first and second plates lying at the same opposite surfaces.

11. A method for producing a plurality of piezoelectric transducers to be arranged in parallel as a recording head in an ink-mosaic recording device which has an increased inking resolution and wherein each of the transducers can eject recording fluid drop-wise towards a recording carrier as a result of a deformation of the individual transducer and also can bend laterally in a direction transverse to the ejection direction, comprising the steps of:

providing a plurality of strips of piezoelectric material arranged in parallel to one another and spaced from one another;

covering the piezoelectric strips at opposite sides with first and second common plates after providing the piezoelectric strips with respective contact elements; and cutting the plates at least over a portion of a length thereof and parallel to the strips so as to form a plurality of transducers wherein each transducer is formed of first and second piezoelectric elements with first and second plates, an ink channel being formed between the plates and piezoelectric elements in each of the transducers.

12. A method according to claim 11 wherein the plates are cut over only a portion of their length so that a comb-like recording head is provided having a plurality of transducer elements connected at a common base portion.

* * * * *